J. Cram,
Wringer Roll,

Nº 58,780. Patented Oct. 16, 1866.

Witnesses:

Inventor:

UNITED STATES PATENT OFFICE.

JOHN CRAM, OF CHICAGO, ILLINOIS.

IMPROVED SHAFT FOR RUBBER ROLLERS FOR WRINGING AND WASHING MACHINES.

Specification forming part of Letters Patent No. 58,780, dated October 16, 1866.

*To all whom it may concern:*

Be it known that I, JOHN CRAM, of Chicago, in the county of Cook and State of Illinois, have invented a new and useful Improved Shaft for Rubber Rollers; and I do hereby declare and make known that the following is a full, clear, and exact description of the same, reference being had to the accompanying drawings and the letters and figures marked thereon, which form part of this specification.

My said invention consists in a novel mode of constructing shafts, upon which rubber is molded when in a plastic state, to form rubber rollers for washing and wringing machines and for any other appropriate uses, whereby the said rubber is firmly and securely attached to or fixed upon the shaft, so as not to become loosened by use or to have either a rotatory or a longitudinal or spreading movement upon and independent of the shaft, as hereinafter more fully set forth and explained.

To enable those skilled in the art to understand how to construct and use my said invention, I will proceed to describe its construction and operation with particularity, reference being made in so doing to the aforesaid drawings, in which—

Figure 1:
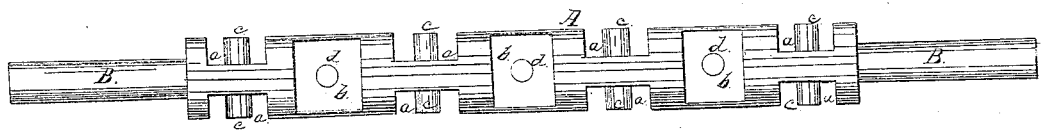
Figure 2:
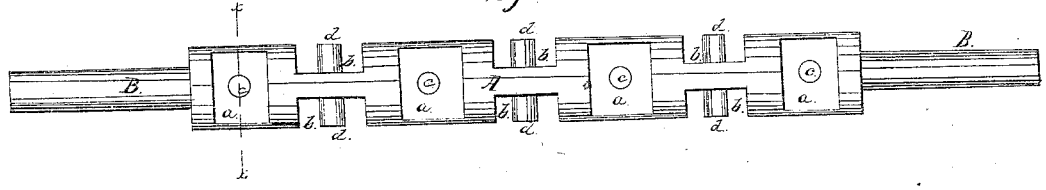
Figure 3:
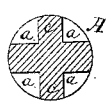
Figure 4:
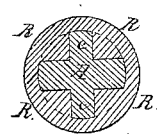
Figure 4:
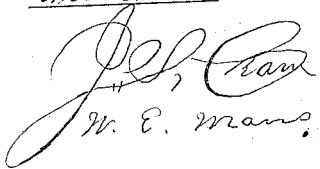
Figure 4:

Figure 1 represents a side view of my said invention. Fig. 2 is a similar view of the same as seen from above. Fig. 3 is a transverse section taken at $x$ in Fig. 2; and Fig. 4 is a similar view with the rubber attached, forming a section of the roller complete.

Similar letters of reference in the several figures denote the same parts of my invention.

A represents the roller, which is made of cast-iron, and afterward galvanized to prevent its rusting and corroding the rubber, which lies in contact therewith, B B representing suitable journals, which revolve in bearings or boxes in the ordinary manner.

$a$ and $b$ represent transverse grooves or recesses cut upon opposite sides of the roller and arranged alternately at right angles with each other, as shown, having pins $c$ $d$ projecting from the center of said recesses out so as to lie flush with the periphery of the roller, as is clearly shown in the drawings.

I prefer to have the said grooves arranged alternately, as shown, and to have the shoulders at each end thereof square; but the arrangement of said grooves and their configuration may be varied, if desired.

The alternate arrangement mentioned gives a greater uniformity in the thickness and firmness of the rubber exterior, and the square shoulders more effectually prevent any longitudinal or spreading movement of the rubber upon the shaft, as aforesaid.

The pins or projections being firmly embedded in the rubber R, and the rubber being molded closely and compactly into the recesses in the shaft, it is obvious that the rubber is held rigidly and immovable upon the shaft, as specified and desired.

Having described the construction and operation of my invention, I will now specify what I claim and desire to secure by Letters Patent.

I claim—

Constructing a shaft, A, with a series of recesses and corresponding pins or projections, arranged and operating substantially in the manner and for the purposes herein specified and described.

JOHN CRAM.

Witnesses:
J. S. CRAM,
W. E. MARRS.